J. H. HALL.
MOTOR CONTROL SYSTEM.
APPLICATION FILED MAR. 7, 1914.

1,155,484.

Patented Oct. 5, 1915.

WITNESSES:

INVENTOR

ATTORNEY

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

MOTOR-CONTROL SYSTEM.

1,155,484.      Specification of Letters Patent.      Patented Oct. 5, 1915.

Application filed March 7, 1914. Serial No. 823,082.

*To all whom it may concern:*

Be it known that I, JAY H. HALL, a citizen of the United States, residing at Cleveland, in the county of Cuyahoga and State of Ohio, have invented new and useful Improvements in Motor-Control Systems, of which the following is a specification.

My invention relates to the control of electric motors, and has for its object the provision of means whereby an electric motor may be started, stopped, and generally controlled in a reliable, simple, and efficient manner.

More particularly, it relates to systems using magnetically-operated switches for controlling the motor circuits and to the use of a dynamic braking circuit for stopping the motor.

In many applications of motor control in which a dynamic braking circuit is used to bring the motor to rest, it is desirable to keep the dynamic braking circuit closed until the motor has actually stopped. In past systems this has been arranged by providing either a normally closed braking switch held closed by gravity or a spring, or by providing the braking switch with a winding supplied with current from the source of power to hold the switch closed after the motor has come to rest. The latter arrangement is objectionable because of the waste of current at times when the motor is at rest. It also causes an undue heating of the apparatus through which the waste current flows.

One of the objects of my invention is to provide means for closing the dynamic braking switch in a reliable manner, and for holding it closed until the motor has actually come to rest, without drawing power from the source of supply to operate the switch or hold it closed.

Other objects and purposes of my invention will appear in the course of the following specification, in which I have shown my invention in concrete form for purposes of illustration.

Figure 1:
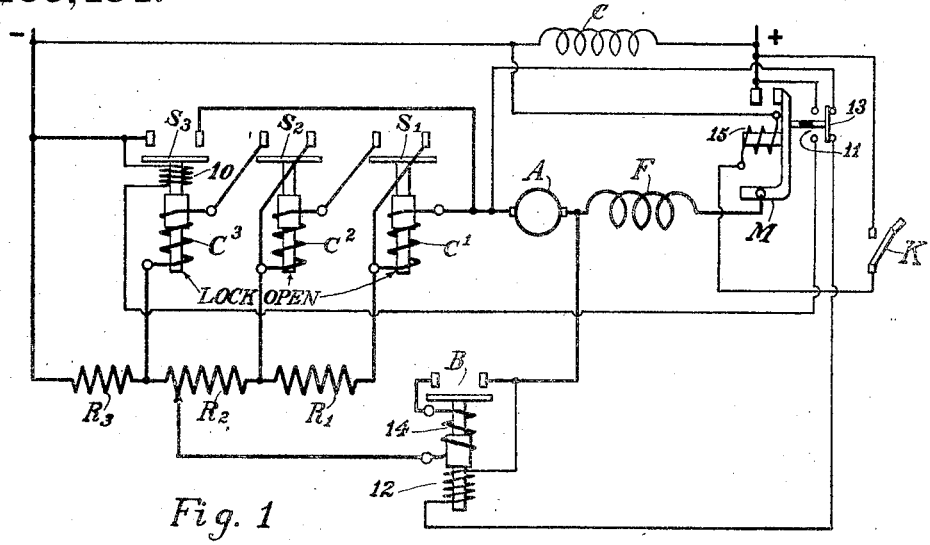
Figure 2:
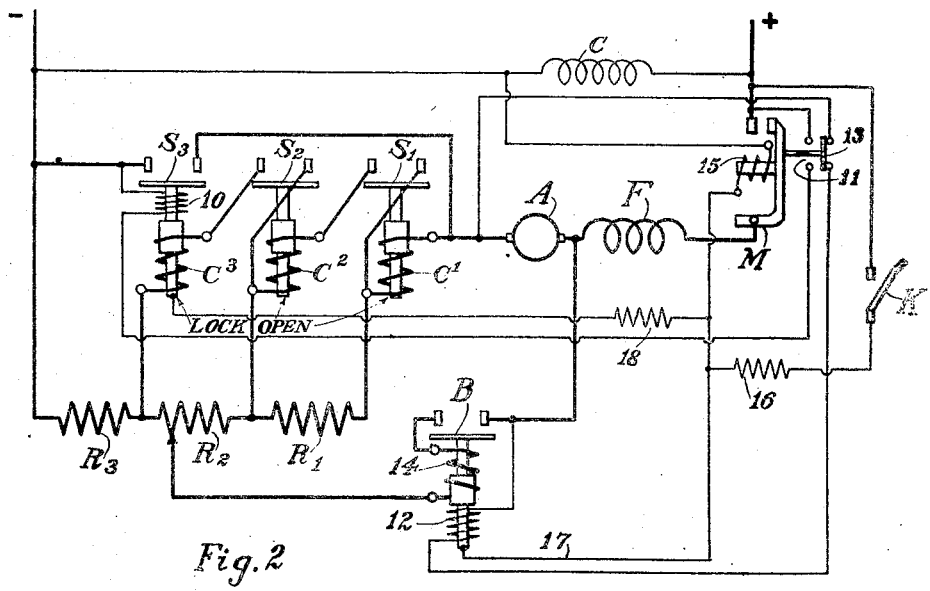

In the accompanying drawing, Figure 1 shows a diagrammatic representation of a control system embodying my invention, and Fig. 2 shows a modification thereof.

In the drawings, the motor to be controlled is indicated by the armature A, the series field F, and the shunt field C. The main switch M connects the motor to the source of supply in series with the starting resistances $R'$, $R^2$, and $R^3$. Any well-known type of resistance cutting out switch may be used for controlling the resistances, but I prefer to use for these switches the type of switch disclosed in Canfield's application, Serial Number 583,000, filed September 21, 1910, and Eastwood's Patent, No. 1,040,292, issued October 8, 1912, in which the operating windings of the switches are connected in series with the motor and the switches possess the peculiar characteristic of being locked open when the current in the winding is high and closing when the current is reduced to a predetermined value. I have placed the legend "Lock open" opposite these switches to indicate this particular characteristic. On the resistance switch $S^3$ I have provided a shunt holding winding 10, which merely acts to hold the switch closed after it has been closed by the operating winding, but it is not sufficiently strong to close the switch. This winding is connected to the source of supply through the auxiliary contacts 11, which are closed upon closure of the main switch M.

The braking switch for closing the dynamic braking circuit for bringing the motor to rest is shown at B, and has an operating winding 12 energized from the counter electromotive force of the motor. The circuit for this winding passes through the contacts 13 on the main switch M, so that the winding 12 can receive current only when the main switch is open. I prefer to use for this braking switch the same type of switch as the acceleration switches $S'$, $S^2$, $S^3$. It differs from these switches, however, in that it is operated by a shunt winding and is adjusted to operate at all values of current to which the said winding will be subjected in operation of the system. To insure that the switch remains closed until the motor has completely come to rest, I provide the holding winding 14, which is arranged to be connected into the dynamic braking circuit through the contacts of the switch B when closed.

The main switch M is provided with an operating winding 15, which is energized upon closure of the master switch K.

The operation of the system is as follows: To start the motor, the operator closes the master switch K, whereupon the main switch M closes, the motor being thereby connected to the source of supply in series with the resistances R', R², and R³ and the operating winding C' of the resistance switch S'. The holding winding 10 of the resistance switch S³ is energized upon closure of the switch M through the contacts 11, but this winding is not strong enough to close the switch S³, but will merely hold the switch closed after it has been closed by its operating winding C³. If the first rush of current in the motor circuit exceeds a safe value, the switch S' will be locked open, as before explained. When the current decreases, due to the acceleration of the motor, to the value at which the switch is adjusted to operate, the switch will close and short circuit the resistance R' and connect into the motor circuit the winding C² of the switch S². The increase of current due to cutting out the resistance R' will cause the switch S² to be locked open. When the current again diminishes to a safe value, due to a further acceleration of the motor, the switch S² will close, short circuit the resistance R², and connect into the motor circuit the operating winding C³ of the switch S³. In like manner the switch S³ will be locked open by the increased current until the latter has diminished to a safe value. When the switch S³ closes it short circuits all of the starting resistance as well as the operating windings of the resistance switches. The switch S³ is then held closed by its holding winding 10, and the switches S' and S² drop open. The motor is thus connected across the suply mains and will operate at its normal speed. When it is desired to stop the motor, the operator opens the switch K, whereupon the switch M opens and disconnects the motor from the source of supply, and causes the opening of the switch S³. The winding 12 of the braking switch is immediately energized with current from the terminals of the armature A through the contacts 13, thus causing the closure of the braking switch B. The braking circuit includes a portion of the starting resistance and the operating winding C' of the switch S'. If upon closure of the switch B the first rush of current in the braking circuit is above the value at which the switch S' is adjusted to operate, this switch will be locked open until the motor has diminished in speed and the braking current has decreased to the predetermined value. The switch S' will then close, short circuit the resistance R', and increase the dynamic braking current and, therefore, the braking effect. In like manner the switches S² and S³ will close to further reduce the resistance in the braking circuit, thus bringing the motor to rest in as short a time as possible without exceeding a safe value of current in the motor armature.

In Fig. 2, I provide an electrical interlock to prevent the closure of the main switch when the dynamic braking switch is closed, even though the operator should close his master switch K during the braking period. This interlock comprises a resistance 16, connected in series with the operating winding 15, and the connection 17 to the movable member of the braking switch B, which shunts the winding 15 when the braking switch is closed. When the braking switch is closed and the master switch K is closed, sufficient current does not flow through the winding 15 to operate the switch M until the braking switch opens its contacts. I also provide a resistance 18 in connection with the operating winding 15, which is connected to the movable member of the resistance switch S³. When the switch S³ closes, the winding 15 is shunted by the resistance 18, which effects a reduction of current in the winding 15, thereby preventing overheating of the winding during the running period of the motor. Sufficient current is allowed to flow in the winding 15 to hold the switch M closed. This arrangement also prevents a reclosure of the switch M after it has been opened until the switch S³ has opened. This latter interlock prevents the closure of the main switch to start the motor if the resistance switch S³ should be closed, cutting out all of the starting resistance.

The resistance 16 limits the amount of current flowing through the switch K when the braking switch B is closed. If this resistance were absent, there would be a circuit of low resistance through the master switch K and the switch B when the latter is closed, which circuit would shunt the motor circuit. Furthermore, the resistance 16, which is in series with the parallel circuits containing the winding 15 and the resistance 18, causes a reduction of current in the said winding and prevents the switch M from closing when the switch S³ is closed.

It will be readily understood that my invention can be applied to a controller for reversing the motor by providing the usual means for reversing the current in the armature or field windings of the motor.

While I have described my invention as being in concrete form and as operating in a specific manner in accordance with the provisions of the patent statutes, it should be understood that I do not limit my invention thereto, since various modifications thereof will suggest themselves to those skilled in the art, without departing from the spirit of my invention.

I claim—

1. In a motor control system, a motor, a resistance, a switch for cutting out the resistance, a winding therefor energized by current through the motor, a main switch for connecting the motor, the resistance, and the said winding to a source of supply for starting the motor, a braking switch for connecting the motor, the resistance, and the said winding in a closed circuit to stop the motor, an operating winding therefor energized by the counter electromotive force of the motor, and a holding winding for the braking switch energized by current in the closed circuit.

2. In a motor control system, a motor, a motor circuit, sections of resistance for the circuit, switches for cutting out the resistances, windings therefor arranged to be connected in the motor circuit, a main switch for connecting the motor, the resistance, and the operating winding of the first resistance to a source of supply for starting the motor, a braking switch for including the motor, the said operating winding, and at least a portion of the resistances in a closed circuit for stopping the motor, and an operating winding for the braking switch energized by the counter electromotive force of the motor.

3. In a motor control system, a motor, a source of supply, a resistance, a main switch for connecting the motor and the resistance to the source, an operating winding therefor, a braking switch for connecting the motor and the resistance in a closed circuit, an operating winding therefor energized by the counter electromotive force of the motor, means for opening the circuit of the braking switch when the main switch is closed, and means for shunting the operating winding of the main switch when the braking switch is closed.

4. In a motor control system, a motor, a source of supply, a resistance, a series of switches for cutting out the resistance, a main switch for connecting the motor and the resistance to the source, an operating winding therefor, a braking switch for connecting the motor and the resistance in a closed circuit, an operating winding therefor, means for opening the circuit of the braking switch when the main switch is closed, and means for shunting the operating winding of the main switch when one of the resistance switches is closed.

5. In a motor control system, a motor, a source of supply, a main circuit for connecting the motor to the source for accelerating the motor, a braking circuit for connecting the motor in a closed loop for retarding the motor, a resistance for controlling both circuits, a switch for controlling the resistance, an operating winding therefor common to both circuits, and an electro-responsive device dependent upon the speed of the motor for closing the braking circuit.

6. In a motor control system, a motor, a source of supply, a main circuit for connecting the motor to the source for accelerating the motor, a braking circuit for connecting the motor in a closed loop for retarding the motor, a resistance for controlling both circuits, a switch for controlling the resistance, an operating winding therefor common to both circuits, an electro-responsive device for closing the braking circuit immediately upon the opening of the main circuit, and holding means for said device included in the braking circuit by the device itself.

Signed at Cleveland, Ohio, this 5th day of March 1914.

JAY H. HALL.

Witnesses:
 RUTH H. BENNETT,
 H. M. DIEMER.